United States Patent [19]

Mosley et al.

[11] E Re. 29,317

[45] Reissued July 26, 1977

[54] PNEUMATIC LUNG ANALOG

[75] Inventors: Kenneth C. Mosley, Grand Rapids; Clare E. Barkalow, Comstock Park, both of Mich.

[73] Assignee: Michigan Instruments, Inc., Grand Rapids, Mich.

[21] Appl. No.: 724,211

[22] Filed: Sept. 17, 1976

Related U.S. Patent Documents

Reissue of:

[64] Patent No.: 3,808,706
Issued: May 7, 1974
Appl. No.: 327,503
Filed: Jan. 29, 1973

[51] Int. Cl.[2] ..... G09B 23/28

[52] U.S. Cl. ..... 35/17; 73/410; 128/2.08

[58] Field of Search ..... 35/17; 128/2.08; 73/410

[56] References Cited

U.S. PATENT DOCUMENTS

| | | | |
|---|---|---|---|
| 2,228,983 | 1/1941 | Bloomheart | 128/2.08 X |
| 2,999,495 | 12/1961 | Shipley | 128/2.08 |
| 3,363,260 | 1/1968 | Garbe | 128/2.08 |

FOREIGN PATENT DOCUMENTS

| | | | |
|---|---|---|---|
| 890,125 | 10/1943 | France | 128/2.08 |
| 1,293,633 | 10/1972 | United Kingdom | 35/17 |

*Primary Examiner*—Harland S. Skogquist
*Attorney, Agent, or Firm*—Price, Heneveld, Huizenga & Cooper

[57] ABSTRACT

A vertically oriented bellows has a fixed plate at one end and a movable plate at the other end. As air flows into the bellows, the movable plate pivots relative to the fixed plate and the free end thereof is cooperative with a readout panel to indicate the volume of the bellows. The plates are interconnected by an adjustable spring urging the plates toward each other when the bellows are expanded to simulate lung compliance. Selected tubes having calibrated flow characteristics interconnect the bellows to a lung ventilator to simulate lung resistance. Preferably, a pair of bellows are arranged in mutual association together to simulate a pair of lungs in order to analyze their interdependency.

31 Claims, 7 Drawing Figures

PNEUMATIC LUNG ANALOG

Matter enclosed in heavy brackets [ ] appears in the original patent but forms no part of this reissue specification; matter printed in italics indicates the additions made by reissue.

BACKGROUND OF THE INVENTION

This invention pertains to an apparatus utilized to simulate a lung in order to evaluate the performance parameters of artificial lung support devices such as an artificial ventilator or respirator.

A variety of devices which act as respirators or intermittent pressure ventilators are utilized in treating and assisting patients unable to breath properly. Ventilators are generally characterized as being either pressure responsive or volume responsive. The ultimate success of treatment depends, of course, on the ability of the ventilator to provide a controlled and predictable flow of air to the lungs during inspiration. During ventilation, back pressure is created essentially by ventilatory resistance and compliance. The acceptability of an inhalation device depends on its performance in response to changes in respiratory resistance and compliance.

To the best of applicant's knowledge, the prior art does not teach a pneumatic lung analog capable through adjustment of simulating a wide range of patient pulmonary physiology ranging from pediatric to large adult patients, with various types and states of pulmonary disease. Such a device would be extremely useful in both evaluating and testing respiratory equipment, and in instruction in respiratory therapy technology. The only devices known to Applicant which relate to lung performance are spirometers. However, the object of these devices is to measure the actual performance of the patient's lung. They do not lend themselves to simulate the patient's lung in order to analyze the performance of ventilation equipment. Thus, there is an important need in this art for a device which simulates the performance of a lung in order to analyze the performance of therapeutic equipment utilized to correct lung disorders.

SUMMARY OF THE INVENTION

In accordance with the invention, simulation of the lung is provided by a bellows secured at one end to a stationary plate means and at the other end to a movable plate means. The bellows are interconnected by a tube to the inhalation equipment for inflation. The movable plate pivots relative to the stationary plate as the bellows is inflated and the free end thereof in association with printed indicia on a panel positioned adjacent permits a visual readout of the volume and compliance characteristics of the inhalator. Compliance is simulated by an adjustable spring means interconnected between the end plates which spring means urges the movable plate toward the fixed plate as the bellows are inflated. Resistance is simulated by calibrated flow resistant tubes interconnected between the bellows and inhalation equipment.

In other and more narrower aspects of the invention, means are provided to eliminate the gravitational effect of the movable plate when the bellows are arranged vertically and stop means are provided to limit the upper and downward movement of the movable end plate. A pair of bellows having independent adjustments are arranged together mutually for operation by the inhalation device in order to simulate the interdependency of a pair of lungs.

In yet narrower aspects of the invention, a restraining means is cooperatively associated with the bellows to assure a uniform inflation of the bellows.

In accordance with the foregoing, a unique lung analog is provided for studying and evaluating the performance characteristics of inhalation equipment. The test lung is also extremely useful as a teaching aid and is housed in a compact composite portable structure to permit utilization of the lung in a variety of environments.

DESCRIPTION OF THE PREFERRED EMBODIMENT

Figure 1:
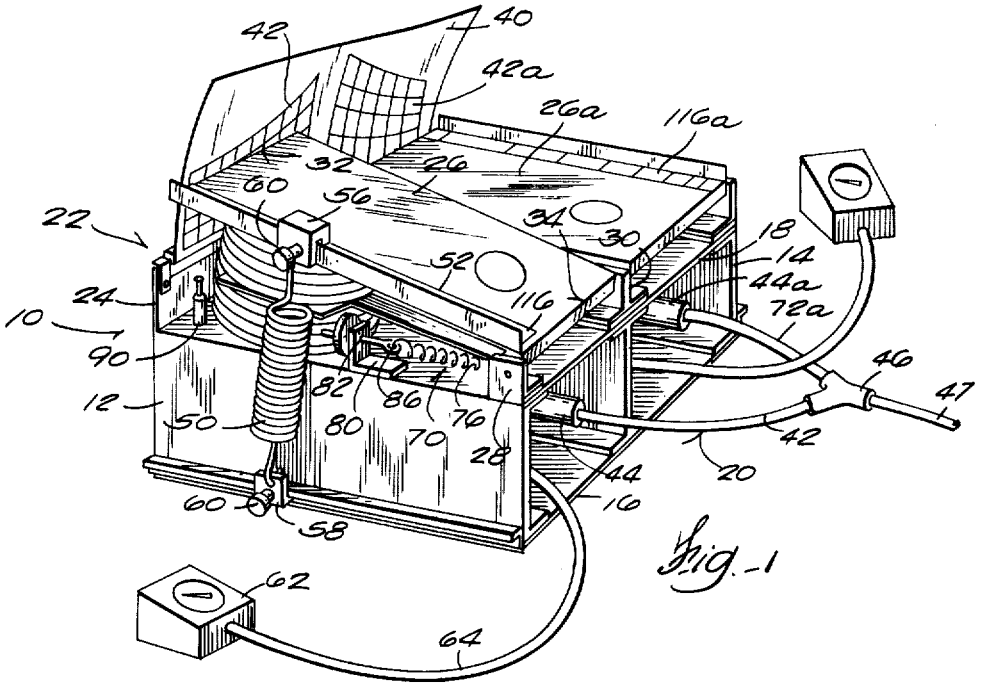
FIG. 1 is a perspective view of the apparatus of my invention illustrating one of the lung simulating bellows inflated.

Referring now to the drawings in detail, FIG. 1 illustrates a box-like support case or frame 10 comprising a pair of sides 12, 14; bottom panel 16 and top panel 18. The front end 20 of support case 10 is open during use while the rear end 22 is closed by a rear panel 26 which extends above top 18.

A movable plate 26 is pivotally anchored to support case 10 by a pair of L-shaped brackets 28 and 30 secured to top 18 at the top end 20 of case 10. The rear edge 32 of plate 26 is free so that plate 26 pivots about a horizontal axis passing generally through the front end 34 of plate 26. The axis of pivot is spaced above top panel 18 so that when plate 26 is level, it is spaced above top panel 18.

A bellows 36 (FIG. 2) is positioned intermediate plate 26 and top panel 18 and closed thereby so that when bellows 36 is inflated, plate 26 pivots relative to top plate or panel 18. A unique graphic panel 40 is arranged in front of the free end 32 of plate 26 and has printed indicia 42 printed thereon in the form of a graph which permits a visual readout of the position of plate 26 relative top 18. As will be described in more detail hereinafter, this provides an accurate readout of the volume and compliance of bellows 36 which in accordance with the invention is an analog of the lung.

Inflation of bellows 36 is achieved by the introduction of air into the bellows through a flow passageway comprised of a tube 42 having one end positioned in a fitting 44 and the opposite end in a Y-fitting 46. Fitting 44 is a permanent part of the support housing and is interconnected to the bellows by a second tube (not shown) which is connected between fitting 44 and bellows 36. A primary supply tube 47 interconnects the Y-fitting 46 with the inhalation device (not shown). The alternative branch of fitting 46 is interconnected to tube 42a and fitting 44a for supplying the second bellows (not shown) of the lung analog. Tubes 44, 44a and 47 are calibrated tubes having defined flow characteristics. They simulate the resistance of ventilating air flow through a pulmonary system. These tubes can be replaced by tubes of varying resistance and are preferably in the form of plastic endotracheal tubes which are plugged into the systems between fittings 44, 44a and 46. For this purpose, the end of each plug-in tube 44 or 44a is fitted with a standard 15 mm fitting (not shown) which plugs into either Y-fitting 46 or fittings 44, 44a. To inflate both lungs simultaneously Y-fitting 46 is provided with three female openings accepting the endotracheal tube fittings. If inflation of only one bellows is desired, the alternative branch of Y-fitting 46 is plugged or a calibrated tube can be connected directly between a bellows and the respirator.

The resistor tubes are calibrated in centimeters of water per liter per second at a differential pressure of 20.0 centimeters of water. Since the flow of gas through a tube is not linearly related to differential pressure (it is approximately proportional to the square root of the differential pressure), the resistance cannot be treated as a constant as differential pressure changes. Flow versus differential pressure curves are included for the standard resistor supplied with the lung analog. Other types of resistors can be devised yielding approximate linearity over limited ranges, and could be substituted for resistors described.

Figure 2:
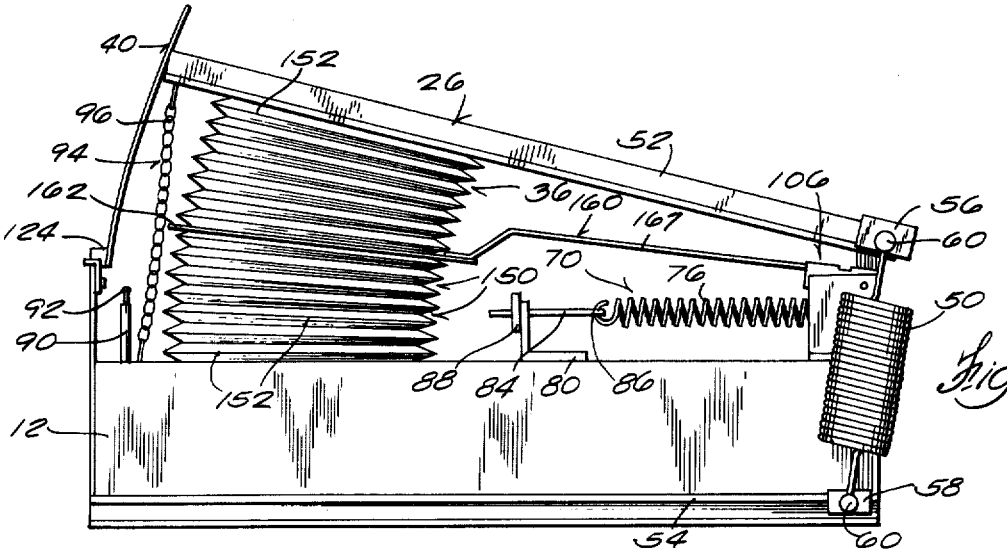
FIG. 2 is a side elevation view of the apparatus illustrated in FIG. 1.

Referring to FIGS. 1 and 2, the simulation of compliance is provided by a spring 50 connected at one end to plate 26 and at its opposite end to case 10 so that as plate 26 is pivoted upwardly by the inflation of bellows 26, an increasing spring force urges the plate back toward its normal horizontal position. The spring is adjustable along the length of plate 26 so that its effective spring force is movable radially with respect to the axis of rotation of plate 26. Preferably, a first guide rail 52 is located along one edge of plate 26 and a second guide rail 54 extends along the lower margin of sidewall 12. An upper slide 46 is movable along guide rail 52 while a lower slide 58 is movable along guide rail 54. Each slide includes a means for attaching the ends of spring 50 thereto in addition to a clamp mechanism for securing each slide at a preselected point along the guide rails. Preferably the clamp mechanism is provided by a thumbscrew 60 threadable through the sidewall of each slide and engageable with the guide rail to lock the slide to the guide rail when the thumbscrew is tightened.

The overall operation of the lung analog can now be readily appreciated. For a given respirator input through tube 42 (FIG. 1) the inflation of bellows 46 will be proportionate to the selected resistance provided by the selection of a calibrated endotracheal tube 42 mounted intermediate the bellows and input tube 47 as well as the preselected compliance selected by the spring force of spring 50 and its location radially from the axis of pivot of plate 26 which rotates upwardly as bellows 46 is expanded. The volume of the bellows is visually read by the alignment of free edge 32 of plate 26 with the graphic printed indicia on panel 40 and the particular pressure can easily be [momitored] *monitored* by a pressure gauge 62 in communication with bellows 26 through tube 64. Referring back to FIG. 1, the pressure in bellows 26 or bellows 26a (not shown) is read directly by pressure gauges 62 and 62a. It is envisioned that the gauges could be mounted directly in panels 26, 26a in the openings 27 shown in FIG. 1. It will be appreciated that only one-half of the analog has been described. The other half is identical thereto and similar elements are identified by the same reference numerals with the suffix a added.

Figure 4:
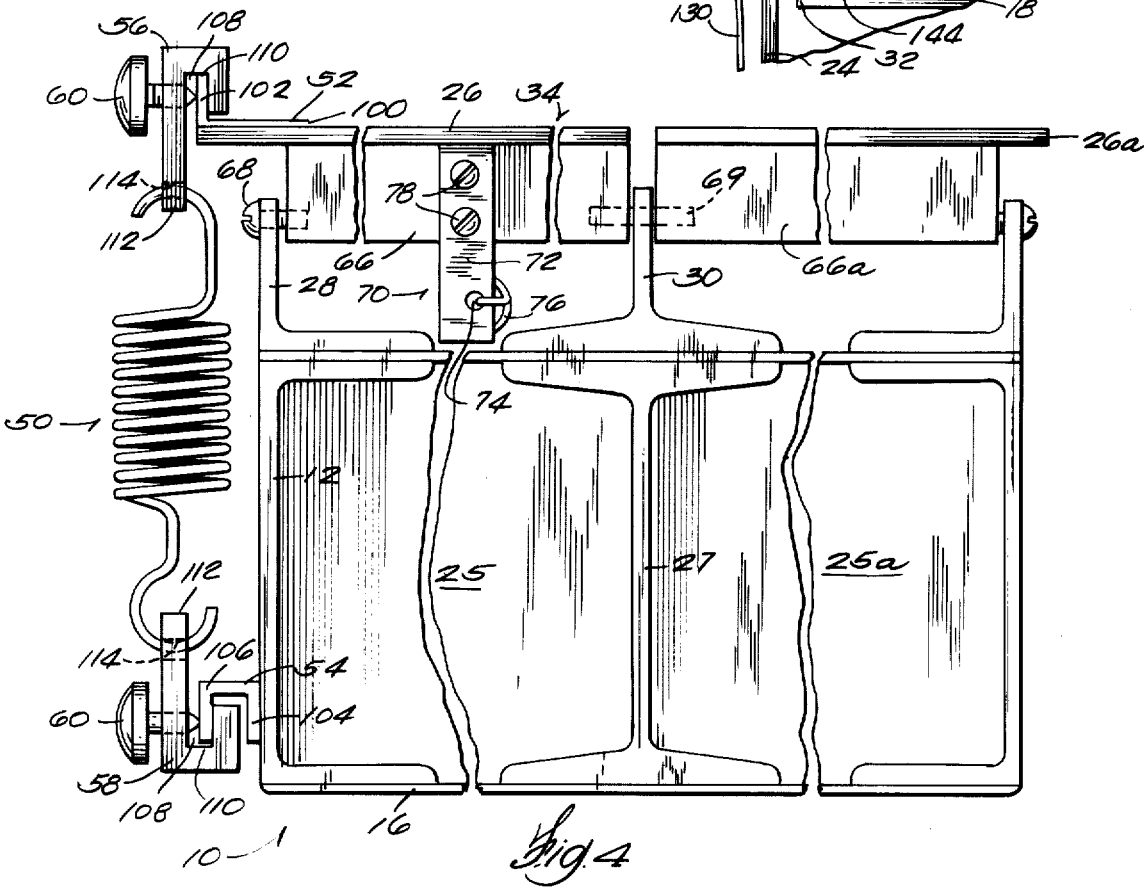
FIG. 4 is an enlarged fragmentary front elevation view of the apparatus illustrated in FIG. 3.

Turning now to the preferred structural details of the embodiment illustrated, as well as additional features provided by the analog, FIG. 4 illustrates in more detail the configuration of plate 26 and its mounting relative to top panel 18. Plate 26 has an overall rectangular configuration with a downwardly projecting flange portion 66 extending from beneath its front end 34. Flange 66 does not extend quite as far as side 12 of support case 10 so that a threaded pin 68 can be mounted through L bracket 28. The interior end of flange 66 is similarly secured to bracket 30 which has an overall inverted T-shaped configuration since bracket 30 also anchors the second movable plate 26a. A pin 70 extends through the stem portion of bracket 30 to pivot both interior ends of flange 66 and 66a.

The plates 26 and 26a are shown in their horizontal position in FIG. 4 and it will be readily appreciated that upon expansion of the bellows as described hereinbefore, the plates will pivot up and away from top plate 18 about the axis of pins 68 and 70. The spacing provided between plates 26, 26a and top 18 of support case 10 is primarily provided to contain the bellows intermediate the movable plates 26, 26a and stationary top plate 18.

The accuracy of the device of my invention is greatly increased by neutralizing the gravitational weight of movable plates 26, 26a. Referring to FIGS. 1–4, a spring compensating mechanism 70 is provided which [elimates] *eliminates* the gravitational effect of plate 26 as a factor in the inflation of bellows 36. A bracket 72 (FIGS. 1 and 4) is attached to flange 66 and extends vertically beneath flange 66 with an aperture 74 provided toward its free end for receipt of one end of coil spring 76. Flange portion 72 as shown in FIG. 4 is comprised of a rectangular piece of stock metal anchored to flange 66 by a pair of threaded fasteners 78.

Referring to FIG. 1, a second L-shaped bracket 80 is anchored to top plate 18 of support case 10 and has an upwardly extending leg portion 82 which is aligned with the opening 74 when movable plate 26 is in the horizontal position. A pin 84 is inserted through opening 82 and has an eye hook 86 at one end for receipt of the opposite end of spring 76 and a threaded end engageable by a fastener 88. Pin 84 slides freely through opening 82 so that the tension in coil spring 76 can be adjusted by the relative position of pin 84. This is accomplished by rotating fastener element 88 in a clockwise or counter-clockwise direction to move pin 84 toward or away from the front end of plate 26. The concept of spring mechanism 70 is to manipulate the device with movable plate 26 in a horizontal orientation so that the weight of the plate against bellows 36 is eliminated.

It will be appreciated that as a spring force is exerted on flange portion 72 (FIG. 3) a moment about the axis of rotation of plate 26 through pin 68 is created urging plate 26 toward clockwise rotation relative to top plate 18 of support case 10. The tension in spring 76 can be adjusted so that the plate is in a state of unstable equilibrium in that it remains in the horizontal position with the urgency for clockwise rotation being counteracted by its gravitational weight.

Figure 3:
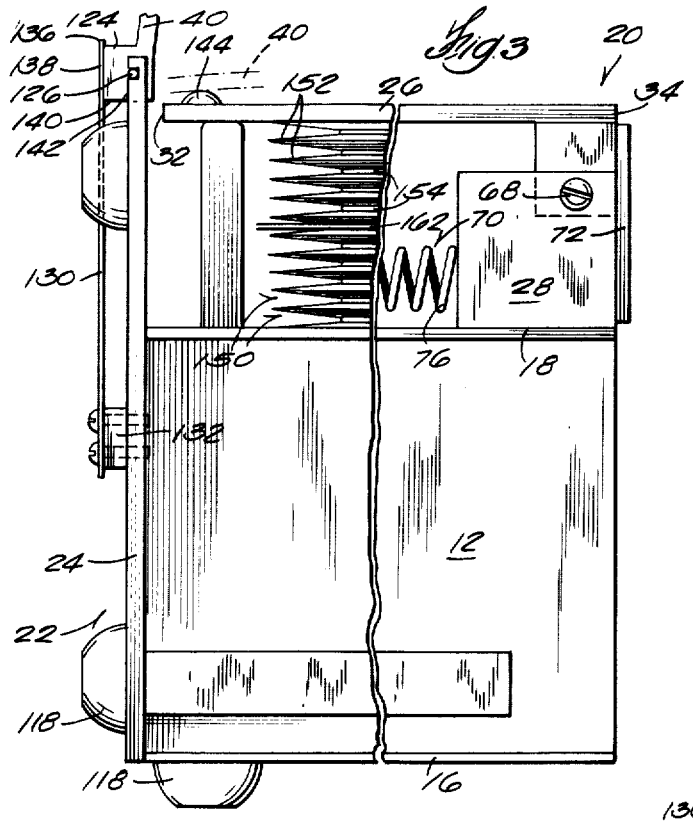
FIG. 3 is an enlarged fragmentary side elevation view of the apparatus of my invention.

Referring to FIGS. 1–3, and especially FIG. 2, a pin 90 is anchored to top panel 18 near the rear end 22 of support case 10 to provide a stop for plate 26 as it pivots counter-clockwise into a horizontal position. The function of pin 90 is to assure proper positioning of plate 26 when bellows 36 are deflated. The height of pin 90 can be adjusted by threading a screw 92 concentrically through the free end of pin 90. An additional stop 94 in the form of a chain 96 prevents accidental over-expansion of bellows 36. Since the bellows are highly accurate elements, they are quite expansive and stop 94 prevents unintentional injury. The chain 96 is anchored at one end to plate 18 and at the other end to the underside of plate 26. The upper maximum position of plate 26 is shown in FIG. 2 with chain 96 being taut.

Referring now to FIG. 4, upper guide rail 52 mounted along the outer edge of movable plate 26 is comprised of an elongated rail having an L-shape configuration. One leg 100 is affixed to the upper marginal surface of plate 26, and the other leg 102 projects perpendicular to the upper surface of plate 26 to form the rail. The lower guide rail 54 has a generally inverted U-shape configuration. One of the legs 104 is attached to the side 12 of case support 10 while the other leg 106 projects downwardly opposite the direction of leg 102 of the upper guide rail forming the sliding rail portion of the lower unit. The slides 56 and 58 which interconnect spring 50 between case support 10 and movable plate 26 are identical to each other although they are oriented in the opposite direction. Each slide has a generally hook-shaped cross section forming a track engaging groove 108. The web portion 110 of each slide is biased by spring 50 into engagement with the upper end of each arm 102 and 106 of the guide tracks for sliding engagement therealong. The groove 108 acts to capture each slide into operative engagement with guide rails 52 and 54. A thumbscrew 60 is threadable through the sidewall of each side for abutting engagement against arms 102 and 106 respectively of the slides to clamp each slide at a selected position along the rail. The free end 112 of each slide includes an opening 114 for receipt of the ends of spring 50.

As noted earlier, the effect of spring 50 and its positioning along the guide rails 52 and 54 simulates lung compliance in that it offers a resistance to the inflation of bellows 26 which resistance increases as the bellows is expanded. A scale 116 (FIG. 1) is conveniently located adjacent the upper guide rail 52 to provide a quick and simple readout of the compliance setting. Through the calibration of spring 50, compliance can be selected over a range from 0.01 to 0.2 liters per centimeter of water for each bellows. The 0.01 setting shown in FIG. 2 with the spring set nearest the axis of rotation of plate 26.

Total pulmonary compliance is obtained by summing the two individual bellows compliance settings. The individual volumes may be read directly from chart 42 or panel 40 as will be described hereinafter. In setting compliance, the bellows should be opened to atmosphere or totally deflated, whereupon the top and bottom slides 56 and 58 are released from clamping engagement with the guide rails by loosening thumbscrew 60. The preferred way to set the compliance is to set the top slide 56 to the value desired by aligning it with the setting indicated on scale 116. This slide should then be locked by tightening thumbscrew 60. Next, the bottom slide 58 is positioned in its "natural" position of vertical alignment below top slide 56. This slide is then tightened and the lung analog is ready for operation. It has been found through use that only the top clamp location is critical for purposes of accuracy. The bottom may be mislocated appreciably without significant adverse effect.

Referring now to FIG. 2, as movable plate 26 is pivoted by the expansion of bellows 26, the rear or free edge 32 along with the entire plate rotates arcuately about the axis of pins 68 and 69. The volume of ventilation achieved in the bellows for the particular compliance and resistance settings is visually ascertained by the graphic indicia printed on the unique panel 40 illustrated in FIG. 1. The panel is curved to match the arcuate path of free edge 32 to provide a direct correlative readout of the volume of bellows 36. Due to several factors which effect the volume of bellows 36 as it expands, the graphic readout illustrated by charts 42 and 42a are calibrated for different compliance settings. The vertical lines on the chart indicate the particular compliance setting since the actual volume of a lung simulated by the device varies depending on the compliance in a nonlinear fashion. One reason for this variance is the compressibility of gas depending on the compliance pressure and the slight bulging of the bellows during inflation. Thus, the volume scale must be calibrated for each setting of compliance. The result of these calibrations are curves represented generally by the horizontal lines on the charts. This method of calibrating the volume scale eliminates the slight error introduced by the variable spring force of spring 50 and variations in bellows volumes due to variable pressures.

Figure 5:
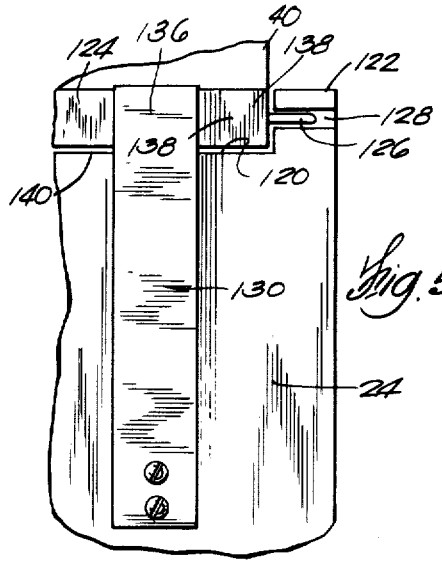
FIG. 5 is a fragmentary rear elevation view of the illustration in FIG. 3.
Figure 6:
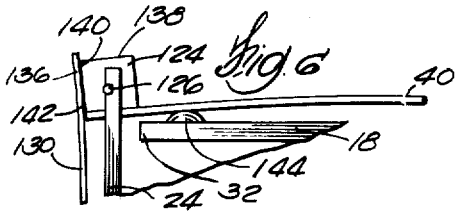
FIG. 6 is a fragmentary side elevation view with the graphic panel folded down.

Turning to FIGS. 2, 5 and 6, panel 40 is pivotally mounted to back panel 22 of support case 10 in such a way that it is biased into either a generally vertical position illustrated in FIGS. 1–3 or a generally horizontal position illustrated in FIG. 6. One of the advantages of the lung analog of the invention is its compactness and portability permitting free transportation of the unit to various areas of use. As noted earlier, the back panel 24 extends above top panel 18. Preferably, it extends a distance above top panel 18 to compensate for the vertical height of bellows 36 and movable plates 26 and 26a when the bellows are deflated. Panel 40 when in the horizontal position fits over the top of movable plates 26 and 26a. Although not shown, when the lung analog is transported and not used, a cover fits over and snaps onto the top of the case while a front panel snaps onto the open front end 20 of the support case. Preferably, the front panel (not shown) which snaps over the open front end 20 of the support case 10 includes a carrying handle so that the unit can be carried similar to a suitcase.

Referring briefly to FIG. 3, bottom 16 and rear panel 24 include a plurality of rubber bumpers 118 to permit supporting the unit on its bottom or end.

Referring now in detail to FIGS. 3, 5 and 6 the upper margin 120 (FIG. 5) of end panel 24 is generally recessed vertically with respect to the upper corners 122 so that panel 40 can be pivotally mounted with respect to the corners 122 and hence fit slightly within the recessed area adjacent upper margin 120. A square rod 124 extending the entire length of panel 40 is attached thereto along its lower margin at the rear surface. A pin 126 is anchored in each end thereof and extends axially from bar 124 for receipt in a groove 128 (FIG. 5) formed in the rear surface of corners 122. Pins 126 are retained in grooves 128 by a pair of resilient spring elements 130 (only one of which is shown) biased against bar 124.

Spring element 130 is spaced from panel 124 by a spacer block 132 (FIG. 3) and extends essentially vertically for engagement with the rearwardmost surface 138 of bar 124. The urgency of spring element 130 against bar 134 is in a generally horizontal inward direction as described previously. When graphic panel 40 is manually flipped up into a vertical position as illustrated in FIGS. 3 and 5, the corner 140 of bar 124 cams spring element 130 rearwardly thereby increasing the effective force spring element 130. As the rearward surface 138 becomes aligned with the upper portion 136 of spring 130, the spring acts as a biased keeper assisting the upper movement of graphic panel 40 so that it snaps into the vertical position shown in FIG. 5. The force of spring element 130 in effect becomes a keeper element retaining panel 40 in its vertical position.

Figure 7:
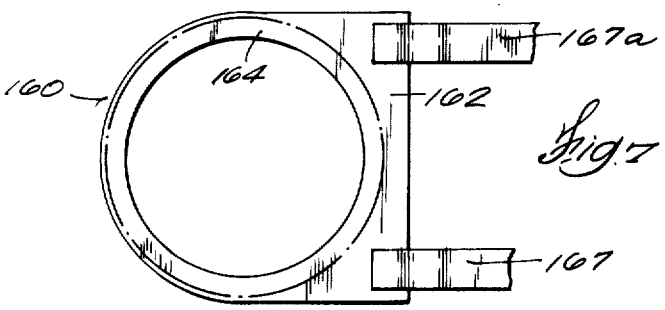
FIG. 7 is a fragmentary plan view of the restraining support for the bellows.

The same functional operation toward the horizontal orientation is shown in FIG. 6. Corner 140 cams the spring outwardly to increase its effective force rate and as soon as it passes the midpoint of rotation approximately 45° from either the vertical or horizontal, the spring urges panel 40 into its downwardly horizontal position as a result of its tendency to seek alignment with the lower surface 142 of bar 124. Thus, the effect of spring element 130 is to urge panel 40 into either the horizontal or vertical orientation thereby preventing unintentional movement of the panel out of either selected position. Preferably, a rubber bumper 144 is positioned on the outer free end of the top surface of movable plate 26 so that when panel 20 is rotated into a horizontal "storage" position as shown in FIG. 7, the upper margin 146 is not permitted to come into contact with the top surface of plate 26. This avoids unnecessary scuffing of plate 26 and in addition, the urgency against the rubber bumper avoids unnecessary rattling or other noise problems as the device is carried about through normal usage. It will be appreciated, that while pin 126 is urged within groove 128 by spring element 130, the entire panel 40 can be quickly and easily removed from support case 10 by pushing outwardly until pin 126 clears groove 128.

Referring now in detail to FIGS. 1 and 2, a unique arrangement is provided to minimize the tendency of bellows 36 from bulging unevenly as they are inflated. Although the inflation of bellows 36 is generally vertical, it does move arcuately as it follows the pivotal movement of plate 26. As a result, there is a tendency of the bellows to sag in certain directions and bulge in other directions since the axis of deflection through the center of the bellows is not a straight line.

Two separate potential problems exist in expanding a bellows such as bellows 36. First, the pleated sections 150 (FIGS. 2 and 3) which are intermediate each accordion section 152 will sometimes bulge causing uneven inflation characteristics. To counteract this a very fine piano wire 154 is wrapped snugly around each pleat 150 when the bellows are deflated. This acts as a restrainer against bulging when the bellows are inflated assuring a uniform expansion of each accordion section 152. A second problem, caused especially by the arcuate expansion of bellows 36 is the tendency for sagging especially on the inside or short radius. Also, the lower accordion sections do not expand as uniformly as the upper accordion sections. To counteract this effect, a bracket 160 (FIGS. 2 and 7) is used to confine or guide the bellows to their proper position. Bracket 160 preferably consists of a sheet metal plate 162 having a punched hole 164 just larger than the pleat of the bellows. Bracket 160 is hinged at its inner end 166 by a pair of arms 167, 167a for rotation about the axis of pins 68 and 70 so that it is free to move up and down with the bellows. However, it defines the position of the bellows in that it prevents for example, the midsection during inflation from sagging inwardly at the point of its smallest radius. Likewise, it prevents outward sagging or bulging. Preferably, the plate is confined about the bellows at its midsection to provide assistance throughout the operational position of bellows 36.

The many advantages and features of my invention provide a unique instructional tool as well as a very precise lung analog with which to test and compare existing lung supportive devices. Applicant is unaware of any prior existing devices.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. A pneumatic lung analog comprising, in combination: a frame; a bellows in said frame, said bellows simulating a lung, said bellows having a stationary end plate secured to said frame and a movable end plate secured to said frame, said movable end plate being pivotal relative to said stationary plate; said bellows having air inlet and air outlet means for inflating and deflating said bellows, said movable end plate pivoting away from said stationary end plate when the flow of air is into said bellows and moving toward said stationary end plate when the flow of air is out of said bellows, said air inlet means defining a passageway having a preselected cross section flow area to simulate a preselected flow resistance through the respiratory track; means biasing said movable end plate toward said stationary end plate, said biasing means *including a spring connected at one end to said movable end plate and at the other end to said frame, said spring providing a force against said movable end plate urging it toward said stationary end plate when said bellows is expanded and* acting as a resistance to the expansion of said bellows, said biasing means simulating the respiratory compliance in a lung; *adjustment means for adjusting the force of said spring acting on said movable end plate, said adjustment means including attachment means anchoring the ends of said spring at various locations radially from the axis of pivot of said movable end plate so that the tension on said spring can be varied for a given angular movement of said movable end plate;* and indicating means associated with said movable end plate, said indicating means providing a performance readout of said lung analog in response to flow through said air inlet means.

[2. The lung analog according to claim 1 wherein said means biasing said movable end plate toward said stationary end plate is a spring connected at one end to said movable end plate and at the other end to said frame, said spring providing a force against said movable end plate urging it toward said stationary end plate when said bellows is expanded.]

[3. The lung analog according to claim 2 wherein the force of said spring acting on said movable plate is adjustable by an attachment means anchoring the ends of said spring at various locations radially from the axis of pivot of said movable end plate so that the tension on said spring can be varied for a given angular movement of said movable end plate.]

4. The lung analog according to claim [3] *1* wherein said attachment means includes a pair of spaced guide rails, one of said guide rails being anchored on said movable end plate and extending radially from the axis of pivot of said movable end plate, the other of said guide rails being anchored to said frame and aligned with said one guide rail, and clamp means movable along said guide rails for receiving the ends of said spring, said clamp means positioning said spring radially with respect to the pivot axis of said movable end plate.

5. The lung analog according to claim 4 wherein said adjustment means includes a calibrated scale along one of said guide rails to provide a visual readout of the position of said spring relative the pivot axis of said movable end plate.

6. The lung analog according to claim 1 wherein said analog is further characterized by an adjustable stop anchored to said frame and limiting the movement of said movable end plate toward said stationary plate to assure the exact position of said movable end plate relative said stationary end plate when said bellows is deflated.

7. The lung analog according to claim 6 wherein said movable end plate is parallel to said stationary end plate when said bellows is deflated.

8. The lung analog according to claim 6 wherein said adjustable stop is a shaft threadably anchored to said frame and extending toward said movable end plate, said shaft having a free end abutting said movable end plate when said bellows is deflated.

9. The lung analog according to claim 1 wherein said analog is further characterized by a stop anchored to said frame and limiting the movement of said movable end plate away from said stationary plate when said bellows is inflated.

10. The lung analog according to claim 9 wherein said stop is a wire means having a preselected length, one end of said wire means being anchored to said frame, the other end of said wire means being anchored to said movable end plate to limit the movement of said movable end plate away from said stationary plate.

11. The lung analog according to claim 1 wherein the axis of said bellows extends vertically when said bellows is deflated and said end plates extending horizontally, said movable end plate extending parallel to and spaced above said stationary end plate when said bellows is deflated; and adjustment means cooperatively associated with said movable end plate to neutralize the effect of its weight as a force acting against said bellows when said bellows is deflated.

12. The lung analog according to claim 11 wherein said adjustment means is comprised of a spring anchored at one end to said movable end plate and at the other end to said frame, said spring when tensioned exerting a force on said movable end plate urging it away from said stationary plate.

13. The lung analog according to claim 12 wherein said movable end plate includes a bracket extending vertically downwardly, said one end of said spring being attached to said bracket at a point spaced below said movable end plate, said spring extending horizontally beneath said movable end plate so that when said spring is tensioned, the force of said spring acts on said movable end plate through said spacing to create a moment urging said movable end plate to pivot away from said stationary end plate.

14. The lung analog according to claim 13 wherein the other end of said spring is movably anchored to said frame to permit selection of the degree of tension on said spring by movement thereof relative said one end.

15. The lung analog according to claim 1 wherein said indicating means is comprised of a panel having printed indicia thereon, said panel being positioned adjacent the free end of said movable end plate and generally perpendicular thereto when said bellows is deflated, said printed indicia having a locus of visual readouts indicating the simulated compliance and volume of the bellows at the associated free end of said movable end plate when pivoted relative the stationary end plate.

16. The lung analog according to claim 15 wherein said panel is curved to match the arcuate path of said free end of said movable end plate to permit a direct readout of the position of said movable end plate.

17. The lung analog according to claim 15 wherein said panel is pivotally anchored to said frame and movable between a generally upstanding position for indicating the position of said movable end plate to a generally horizontal position for storage and transportation.

18. The lung analog according to claim 17 wherein said indicating means further includes means retaining said panel in either of said selected positions to prevent unintentional movement towards the other of said positions.

19. The lung analog according to claim 18 wherein said indicating means further includes resilient bumper means engageable with said panel in said generally horizontal position to avoid vibration of said panel during storing and transportation of said lung analog.

20. The lung analog according to claim 1 wherein said means defining a passageway is comprised of a tube having a preselected cross section and length thereby defining a preselected volume flow at a preselected pressure, said tube being replaceable by similar tubes of varying cross section in order to simulate various respiratory resistances.

[21. The lung analog according to claim 1 wherein means are provided around the pleats of said bellows to restrain said bellows during inflation from bulging nonuniformly.]

[22. The lung analog according to claim 21 wherein said latter means are comprised of a plurality of thin wires encircling each of said pleats snugly when said bellows is deflated.]

[23. The lung analog according to claim 1 wherein said end plates extend horizontally and the axis of said bellows extends vertically when said bellows is deflated, the axis of said bellows forming an arc when said bellows is inflated, said lung analog being further characterized by a retaining means mounted intermediate said end plates for pivotal movement about the axis of pivot of said movable end plate, said retaining means encapsulating one of the pleats of said bellows to prevent said bellows from sagging or bulging while said bellows in inflated.]

[24. The lung analog according to claim 23 wherein said retaining means comprises an annular ring means positioned about said one of the pleats and pivotally anchored to said frame by one or more brackets.]

25. A pneumatic lung analog comprising, in combination: a housing; a pair of bellows anchored at one end to said housing, said bellows each having a movable plate means secured to the other end, each of said plate means being pivotally anchored to said housing so that when said bellows are inflated, said plates pivot arcuately relative to said housing; air inlet and outlet means for inflating and deflating each of said bellows independently of each other; first means associated with each of said bellows for controlling the flow of air into said bellows at a preselected flow rate at a preselected differential pressure to simulate lung resistance; second means associated with each of said bellows resisting the inflation of said bellows to simulate lung compliance; *said second means including spring means interconnected between said housing and movable plate means, said spring means resisting inflating of said bellows by urging said movable plate means toward said one end of said bellows as said bellows are inflated; adjustment means for adjusting the force of said spring acting on said movable plate means, said adjustment means including attachment means anchoring the ends of said spring at various locations radially from the axis of pivot of said movable end plate means so that the tension on said spring can be varied for a given angular movement of said movable end plate means;* and third means associated with each of said bellows for indicating the differential pressure, volume and compliance of said bellows.

26. The lung analog according to claim 25 wherein said first means is comprised of one or more flow tubes connected to said inlet means and having an arbitrary length and cross section calibrated for a known volume flow at given pressure differentials.

27. The lung analog according to claim 26 wherein each of said bellows includes separate air inlet means connected to a common source of air by individual flow tubes.

[28. The lung analog according to claim 25 wherein said second means is comprised of a spring means interconnected between said housing and movable plate means said spring means resisting inflating of said bellows by urging said movable plate means toward said one end of said bellows as said bellows are inflated.]

29. The lung analog according to claim [28] *25* wherein said spring means is adjustable along a radius extending from the axis of rotation of said plate means to vary the effective force of said spring means to arbitrarily vary the simulated compliance of said lung analog.

30. The lung analog according to claim 25 wherein said third means includes a panel positioned adjacent the free end of said plate means, said panel including graphic indicia on its face calibrated to indicate the volume and compliance of said bellows at each position thereof during inflation by comparing the position of the free end of said plate means along said graphic indicia.

31. The lung analog according to claim 30 wherein said panel is curved in accordance with the arcuate movement of said plate means.

32. The lung analog according to claim 30 wherein said panel includes separate graphic indicia for each of said bellows and plate means.

33. The lung analog according to claim 30 wherein said graphic indicia is calibrated for different differential pressures.

34. The lung analog according to claim 30 wherein said third means further includes pressure gauges associated with each of said bellows to provide a differential pressure readout.

35. The lung analog according to claim 25 wherein said analog further includes stop means limiting the pivotal movement of said plate means in either direction.

36. The lung analog according to claim 25 wherein said bellows are mounted side-by-side, said plate means being pivotal about a horizontal axis.

37. The lung analog according to claim 36 wherein said analog includes fourth means for neutralizing the gravitational weight of said plate means and bellows.

38. The lung analog according to claim 37 wherein said fourth means includes an adjustable spring means urging said plate means and bellows toward an inflated position, said adjustable spring means being preset to offset the gravitational weight of said bellows and plate means urging said bellows and plate means toward deflation.

* * * * *